April 19, 1966 F. WETHLY 3,247,079
CONTROLLED BRACING OF COKE OVEN BATTERY ROOFS
Filed Nov. 3, 1961 2 Sheets-Sheet 1
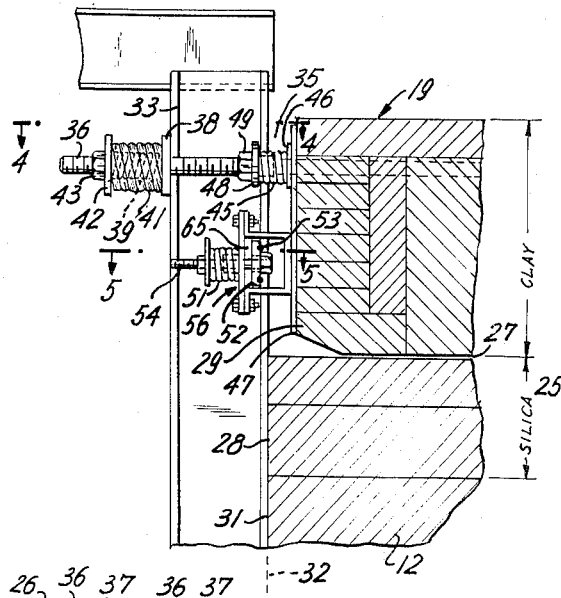
FIG. 2
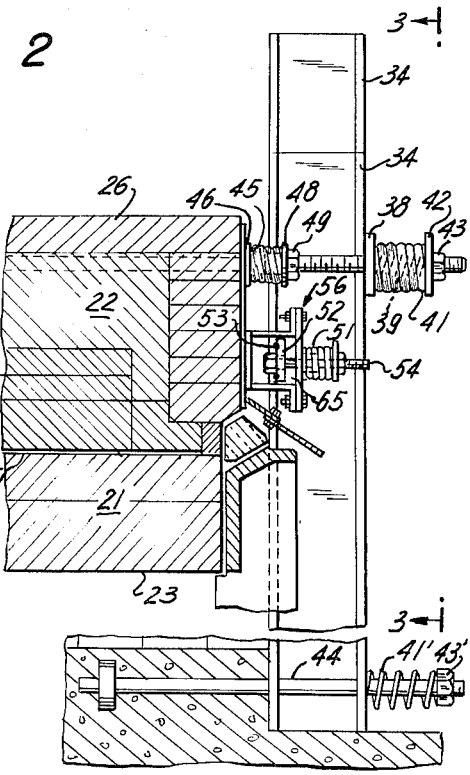
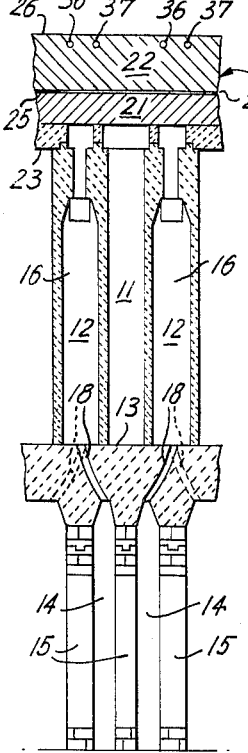
FIG. 1
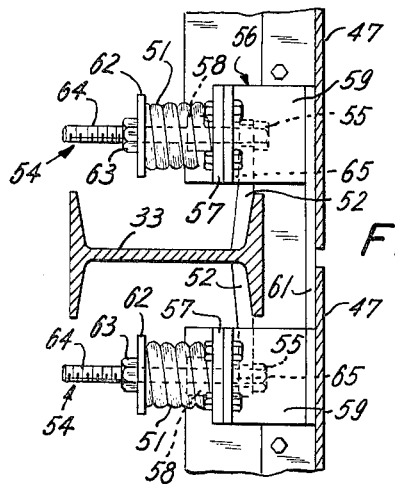
FIG. 5
INVENTOR.
FRANS WETHLY
BY
Benjamin Sweedler
ATTORNEY April 19, 1966 F. WETHLY 3,247,079
CONTROLLED BRACING OF COKE OVEN BATTERY ROOFS
Filed Nov. 3, 1961 2 Sheets-Sheet 2
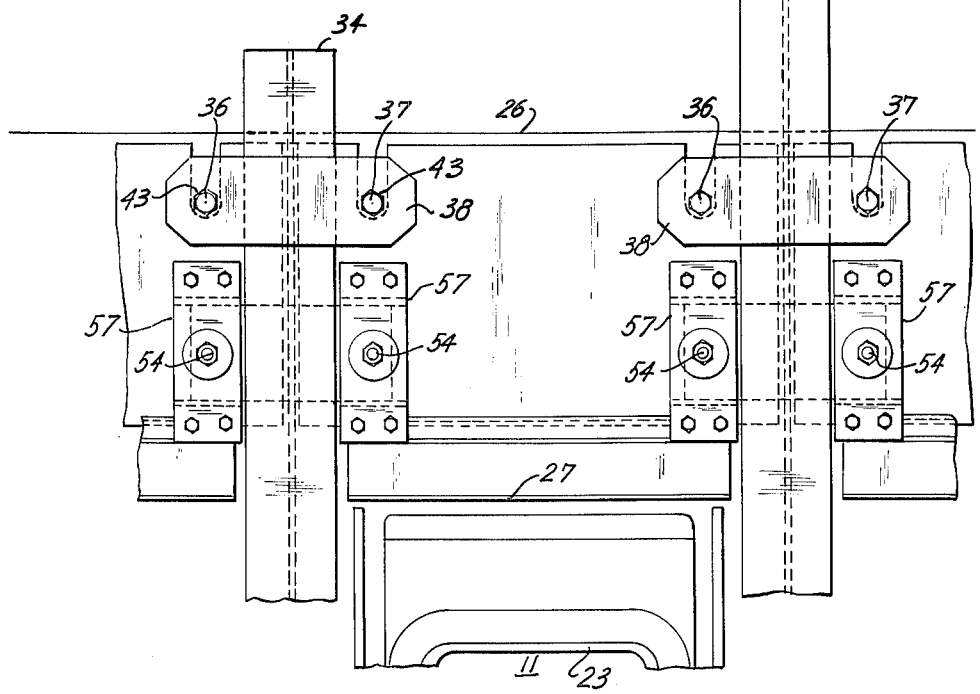
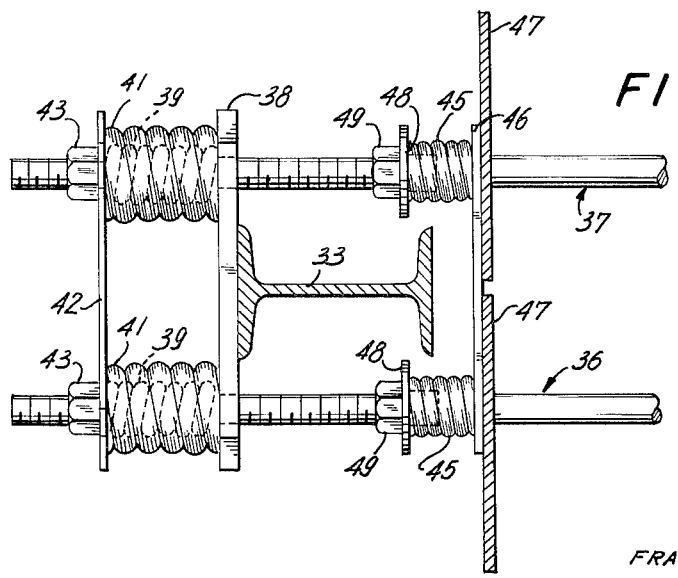
INVENTOR.
FRANS WETHLY
BY
Benjamin Sweedler
ATTORNEY United States Patent Office 3,247,079
Patented Apr. 19, 1966

3,247,079
CONTROLLED BRACING OF COKE OVEN BATTERY ROOFS
Frans Wethly, Manhasset, N.Y., assignor to Allied Chemical Corporation, New York, N.Y., a corporation of New York
Filed Nov. 3, 1961, Ser. No. 150,010
2 Claims. (Cl. 202—267)

This invention relates to coke oven batteries, and more particularly to regenerative coke oven batteries having heating walls composed of silica refractory brick and oven roofs of fire clay refractory brick in the upper portion thereof.

Coke oven batteries are known, in which the roof is of fire clay brick and the heating walls of silica brick. When heating such a battery from the ambient to operating temperatures, differential expansion of the fire clay brickwork section of the oven roof relative to the adjacent silica brickwork takes place. The conventional rigid buckstays bearing initially against the ends of both the silica and fire clay brickwork of the battery are thus displaced outwardly by the thermal expansion of the silica brickwork, leaving the less expansive fire clay brickwork oven roof section unrestrained. With no restraining force to oppose the contact friction between the fire clay and silica brickwork, the fire clay is placed under tensile stresses which can result in crack formation in the roof.

It is among the objects of the present invention to provide a coke oven battery having silica brick heating walls and a roof, the upper section of which is composed of fire clay brick, which battery is constructed to maintain the fire clay roof section under compressive forces to minimize crack formation during the heating up and during operation of the battery.

Other objects and advantages of the invention will be apparent from the following detailed description thereof.

In the accompanying drawings forming a part of this application and showing, for purposes of illustration, a preferred embodiment of the invention, FIGURE 1 is a fragmentary longitudinal section through a regenerative coke oven battery embodying the present invention;

FIGURE 2 is a fragmentary composite vertical section taken crosswise of the battery of FIGURE 1, showing the roof of the battery and the buckstay and compression member structure for applying and maintaining compressive forces on the fire clay and silica brickwork. The left hand portion of FIGURE 2 is taken through the upper portion of the battery above a heating wall and the right hand portion is taken through the upper portion of the battery above a coking chamber; this view is on a greatly enlarged scale as compared with FIGURE 1 and shows the parts in their relative position when the battery is at operating temperatures, i.e. in the heated up condition;

FIGURE 3 is a fragmentary elevation viewing the battery in the direction indicated by the arrows 3—3 in FIGURE 2, on an enlarged scale as compared with the scale of FIGURE 2;

FIGURE 4 is a fragmentary horizontal section through the buckstay and retaining plates and plan view showing the tie rods and associated buckstay structure, on an enlarged scale as compared with FIGURE 2; this view is taken looking down from a plane passing through line 4—4 on FIGURE 2; and FIGURE 5 is a fragmentary horizontal section and plan view taken looking down from a plane passing through line 5—5 in FIGURE 2, on an enlarged scale as compared with the scale of FIGURE 2, showing the compression springs for exerting compression forces against the lower portion of the fire clay brickwork.

As shown in FIGURE 1, the preferred embodiment of the coke oven battery of the invention comprises alternate coking chamber 11 separated by heating walls 12 and having beneath the sole 13 of the coking chambers 11 alternate cross-wise extending regenerators 14, separated by regenerator pillar walls 15. Each coking chamber is provided with the usual charging holes and with a gas discharge conduit leading into a collector main, which conventional elements are not shown in the drawings. Each heating wall 12 is composed of silica brick arranged to define the heating flues 16. These flues 16 communicate with the regenerators through suitable ports 18 for flow of air through the air inflow regenerators to the inflow flues (or, in the case of a combination oven, air through some and lean gas through other inflow regenerators, to the inflow heating flues in the heating walls), and the outflow of products of combustion from the outflow heating flues through the outflow regenerators. Upon reversal, the inflow flues and regenerators become outflow flues and regenerators, and vice versa. Since the present invention is applicable to all coke oven batteries irrespective of the particular design of flues, regenerators and associated known parts such as the collector main or mains, and the waste heat flue communicating with the stack, etc., further description of these known parts of the battery is believed unnecessary.

In accordance with the invention, and as shown in FIGURES 1 to 3, the oven roof 19 comprises a lower section 21 constructed of silica brick and an upper section 22 constructed of fire clay refractory brick. The lower section 21 extends for one or more courses from the top 23 of each coking chamber, to level 25 of the battery, from which level the upper section 22 extends to the top 26 of the battery. A shear joint 27 is formed between the silica and fire clay brickwork at the level 25 of the battery.

Joint 27 can be formed by placing paper board which has low shear resistance, tar paper, finely divided silica sand or lubricating agent stable at prevailing temperatures between the lowermost course of fire clay brick in the upper section of the roof and the course of silica brick just beneath this lowermost course of fire clay brick.

While, as described above, it is preferred to construct the oven roof 19 of two sections, the upper of which is constituted of fire clay and the lower of which consists of two courses of silica brick, which sections are separated by a shear joint, it will be understood that the invention is not limited to a battery in which the lower section consists of two courses of silica brick but the lower section may consist of only one, or more than two courses of silica brick.

As built, each of the opposite sides of the coke oven battery lie in one and the same vertical plane. That is to say the opposite sides 28 of the silica lower roof section 21, the opposite sides 29 of the fire clay upper roof section 22, and the opposite ends 31 of the silica heating walls 12 therebeneath, are positioned in opposite vertical planes, respectively, held together by the buckstays 33 and 34 on the opposite sides thereof as hereinafter more fully described. Upon heating the battery to operating temperatures, differential thermal expansion of the silica and fire clay brickwork takes place, causing the ends 31 of the silica heating walls and the sides 28 of the silica lower roof section to move away from the longitudinal median of the battery a greater distance than such movement of the sides 29 of the fire clay roof section thereabove. The extent of differential movement during heating up will depend on the width of the battery. For a battery 45 feet wide, the differential movement can be about two inches on each side or a total of about four inches. Thus, in the heated up condition, the opposite sides 29 of the fire clay upper roof section 22 are set back relative to the vertical plane, indicated by line 32 in FIGURE 2, passing through the ends 31 of the heating walls and the sides 28 of the silica lower roof section. This set back, as noted, is of the order of two inches for a battery 45 feet wide.

Vertical buckstays 33 and 34 are arranged in pairs on the opposite sides of the battery, buckstays 33 positioned on the left-hand side of the battery viewing FIGURE 2 and buckstays 34 on the right-hand side. The members of each pair of buckstays 33 and 34 are positioned at the opposite ends 31 of each heating wall 12, extending the full height of the battery, and terminate above the oven roof 19. The buckstays 33 and 34 bear against the ends 31 of the heating walls, and the sides 28 and 29 of the lower and upper roof sections 21 and 22, respectively, of the battery as built, i.e., when cold. During heating up of the battery the buckstays are pushed outward by the silica brickwork of the heating walls and lower roof section, as shown on the left hand side of FIGURE 2, thus remaining in abutment against the ends 31 of the heating walls and the sides 28 of the lower roof section 21, but forming a space 35 between the buckstays and the sides 29 of the upper roof section 22.

Since the structure of the buckstays 33 and 34 of each pair, and the compression members associated with each such buckstay is the same, only one buckstay will be described in detail below.

Each buckstay 33 can be one or more I-beams, channels or other structural members, extending, as noted, from the top 26 to the base of the battery. A pair of tie rods 36 and 37 (FIGURES 2, 3 and 4) extend through the upper fire clay section of the oven roof 19 and protrude beyond the sides of the battery on opposite sides of each buckstay; the free ends of the tie rods are threaded and are received in apertured cross pieces 38 bearing against the adjacent buckstays. Mounted on the free ends of each tie rod are inner and outer compression springs 39 and 41 (see FIGURE 4) which exert compressive forces on the cross pieces 38 adjustable by compression plates 42, and nuts 43 in threaded engagement with the tie rods 36 and 37. Instead of the pair of springs 39, 41 a single heavier spring, can be used. Adjustment of the nuts 43 varies the force exerted by the compression springs 39 and 41 on the buckstays 33 and 34 of each pair toward one another. Preferably, each pair of compression springs 39 and 41 exerts an aggregate compressive force of the order of 10,000 to 15,000 pounds.

The tie rods 36, 37 and the cooperating springs 39, 41 at the opposite ends thereof thus exert an adjustable compressive force on the upper ends of the buckstays. The lower ends of the buckstays, as shown in FIGURE 2, are fastened by anchor bolts 44 having compression springs 41′ thereon exerting compressive forces on the lower ends of the buckstays toward the longitudinal median of the battery. The compressive force exerted by springs 41′ is adjustable by movement of nuts 43′. The buckstays are thus firmly held against the ends of the silica brick portions of the battery maintaining the silica brick under compressive forces from the opposite sides of the battery toward the longitudinal median of the battery which forces are maintained substantially constant. As the silica brick expands during heating up, as noted above, the buckstays move outwardly and the compressive forces exerted thereby on the silica brickwork is adjusted from time to time by adjusting the position of the nuts 43 and 43′ to maintain the silica brickwork under substantially constant compressive forces from the opposite sides of the battery toward the longitudinal median thereof, thus tending to minimize crack formations in the silica brickwork and to close up any cracks or fissures which may form.

Compression springs 45 are mounted intermediate the ends of the tie rods 36 and 37 bearing against contact plates 46 which bear, in turn, against retaining members 47 on the sides 29 of the fire clay upper roof section 22. Members 47 desirably are metal armor plates protecting the sides of the fire clay roof section. They are held in place by the contact plates 46 or otherwise.

The springs 45 are confined between the flanges on sleeves 48 on the tie rods 36 and 37 and the contact plates 46. The compressive force exerted by the springs against the fire clay brickwork of the roof is controlled by the position of nuts 49 bearing against the flanges of sleeves 48. Each spring 45 preferably exerts a compressive force of the order of from 2,000 to 3,000 pounds on the fire clay brickwork.

As shown in FIGURES 2, 3 and 5, pairs of compression springs 51 are mounted on opposite sides of each buckstay for exerting compressive forces on the lower portion of fire clay roof section 22. Each compression spring is mounted on an assembly including an apertured cross piece 52 welded as at 53 to the inside flange of the adjacent buckstay 33 or 34. A bolt 54 having a head 55 passes through each cross piece 52, the head 55 of the bolt bearing against the cross piece. A bearing assembly 56 is mounted on each pair of bolts 54, on opposite sides of each buckstay 33 or 34. The bearing assembly includes a pair of apertured plates 57 having collars 58 through which the bolts 54 extend, which plates are bolted or otherwise fastened to a pair of channel shaped brackets 59 positioned at the opposite ends of a bearing plate 61. The plate 61 bears against the retaining members 47 at the side 29 of the fire clay brickwork.

Each of the springs 51 is mounted on a bolt 54 and has one end encircling the collar 58 on the plate 57. The other end abuts an end piece 62 moveable on the bolt 54. A nut 63 is in threaded engagement with the free end 64 of the bolt 54 and bears against the moveable end piece 62. Adjustment of the force exerted by each spring 51 through the bearing member 56 against the fire clay brickwork is effected by turning this nut 63. The force exerted by each of the springs 51 preferably is of the order of from 4,000 to 5,000 pounds during heating up and when the battery is at operating temperatures.

When, due to differential expansion of the silica and fire clay portions of the battery, the buckstays are moved away from the sides of the roof section 22, the bolts 54 bearing against the cross pieces 52 similarly move outwardly. A space 65 is provided between each cross piece 52 and the apertured plate 57 of the bearing assembly 56; this space permits outward movement of bolt 54 without moving the bearing assembly 56 from bearing relation against the retaining members on the side 29 of the fire clay brickwork. The nuts 63 move outwardly with the bolts 54, hence the springs 51 expand, thereby reducing the force exerted by each spring 51 through the bearing member 56 against the fire clay brickwork. The nuts 63 are periodically tightened to compensate for this reduction and in order to maintain the compressive forces on the opposite sides of the lower portion of the fire clay roof section substantially constant throughout the heating up and during the operation of the battery.

As noted above, when the coke oven battery is heated up, the differential thermal expansion of the silica and fire clay effects movement of the buckstays 33 and 34 laterally away from the longitudinal median of the battery a distance equal to the expansion of the silica brickwork of the heating walls 12 and lower roof section 21, leaving the space 35 between the buckstays and the sides of the fire clay brickwork of the upper roof section 22. During this expansion the pairs of buckstays 33 and 34 are maintained under compressive forces exerted by the compression springs 39, 41 and 41′ on the tie rods and anchor bolts. At the same time the opposite sides 29 of the fire clay upper roof section 22 are maintained under compressive forces exerted by the compression springs 45 and 51, notwithstanding the movement of the buckstays out of contact with the sides 29 of the upper roof section. The compressive forces thus exerted on the fire clay are adjusted from time to time as the battery is heated up to take into account expansion of the fire clay and to maintain the opposite sides of the fire clay portion of the roof under substantially constant compressive forces from the sides of the roof toward the longitudinal median of the battery.

The compressive forces thus exerted on the fire clay roof section 22 minimize, if not prevent, the formation of any cracks in the roof including the portion thereof adjacent the shear joint 27; should any cracks develop during the heating up, they are closed by the compressive forces exerted on the roof section 22.

When the heating up procedure is completed, further adjustment is seldom necessary, the structure herein described serving to minimize or prevent crack formation in the fire clay roof section during normal operation.

A typical composition of conventional silica brick is from 95% to 97% silica ($SiO_2$), from 0.25% to 1.2% alumina ($Al_2O_3$), from 1.8% to 3.5% lime (CaO), from 0.3% to 0.9% iron oxide ($Fe_2O_3$), and from 0.1% to 0.3% other oxides. A typical composition of the so-called high duty fire clay brick is from 65% to 80% silica ($SiO_2$), from 18% to 28% alumina ($Al_2O_3$), from 1.0% to 2.0% titania ($TiO_2$), and from 2% to 6% other oxides. It will be understood that these typical compositions are given for illustrative purposes only and the expressions "silica" and "fire clay" are used herein in the sense well known in this art to include such refractories having the commercial designations of silica and fire clay, respectively.

It will be understood that the embodiment of the invention shown in the drawings and described herein may be modified without departing from the scope of this invention. Since other changes will occur to those skilled in the art, all matter contained in the above description or shown in the accompanying drawings shall be interpreted as illustrative and not in a limiting sense.

What is claimed is:

1. A coke oven battery comprising heating walls and coking chambers arranged side by side in alternate relation, the heating walls being composed of silica brick, a roof consisting essentially of an upper fire clay brick section, said section having upper and lower areas, a lower silica brick section separated from the upper fire clay-brick-section by a shear joint, which fire clay and silica are co-extensive as built, the opposite sides of said fire clay brick section being set back from said silica relative to vertical planes passing through the ends of the heating walls when the latter are heated up to oven operating temperature, a vertical buckstay at each end of each heating wall extending substantially the full height of the battery and bearing differentially against the silica brickwork of the adjacent heating wall, the upper portion of said vertical buckstay being spaced from the side of the fire clay brick section of the roof when the battery is in the heated up condition at operating temperature, and compression means associated with each buckstay adjacent the fire clay roof section for differentially applying compressive forces to the opposite sides of said fire clay roof section as opposed to said silica brick section, said compression means comprising a spring means mounted on each buckstay and exerting compressive forces on both the upper and lower areas of the fire clay brick roof section in the locality thereof adjacent the buckstay, the spring means mounted on opposite buckstays across the width of the battery exerting compressive forces on the sides of the fire clay brick roof section adjacent thereto toward the longitudinal median of the battery, and means to adjust the compressive force exerted by said spring means, said roof also including tie rods extending through the fire clay brick roof section, means on each tie rod for exerting a force on the adjacent buckstay directed toward the longitudinal median of the battery, and in which said compression means comprises a compression spring mounted on each tie rod for applying a compressive force against the fire clay brick work roof section.

2. A coke oven battery comprising heating walls and coking chambers arranged side by side in alternate relation, the heating walls being composed of silica brick; a roof comprising an upper section composed of fire clay brick, a lower section composed of silica brick, the upper section being separated from the lower section by a shear joint, the opposite sides of said fire clay upper roof section being built not more than the same distance from the centerline of the battery as the opposite sides of the silica brick lower roof section and the ends of the silica brick heating walls therebeneath whereby when the battery is heated up to operating temperatures, the fire clay section will be set back relative to the vertical planes passing through said opposite sides of said silica brick lower roof section and said silica brick heating walls, said opposite sides of said fire clay section having upper and lower portions; a vertical buckstay at each end of each heating wall extending substantially the full height of the battery and bearing against the silica brick of the adjacent heating wall and also against the lower silica brick section of the roof, but not against the sides of the set back upper fire clay roof section when the battery is heated up to operating temperatures, leaving a space between the sides of the set back upper fire clay brick roof section and the buckstay adjacent thereto on each of the opposite sides of the battery; tie rods extending between the upper ends of each pair of oppositely disposed buckstays adjacent the ends of each heating wall positioned in and near the top of the upper fire clay brick roof section; a first pair of compression springs on each of said tie rods for applying compressive forces to the upper portions of the sides of the fire clay brick roof section; means on each tie rod at each of the opposite ends thereof for adjusting the compressive forces exerted by said springs on the upper portions of the sides of the fire clay brick roof section adjacent thereto; a second pair of compression springs on the ends of each tie rod for applying compressive forces directly to the upper ends of said buckstays; means on the opposite end of each tie rod for adjusting the compressive forces exerted by said second pair of compression springs on said buckstays; and means on each buckstay comprising adjustable compression springs for applying compressive forces to the lower portion of the sides of said fire clay brick roof section.

References Cited by the Examiner

UNITED STATES PATENTS

| 2,147,681 | 2/1939 | Van Ackeren | 202—268 |
| 2,665,242 | 1/1954 | Otto | 202—268 |
| 2,761,827 | 9/1956 | Van Ackeren | 202—268 |
| 2,812,293 | 11/1957 | Van Ackeren | 202—268 |

FOREIGN PATENTS

| 491,278 | 8/1938 | Great Britain. |
| 667,566 | 3/1952 | Great Britain. |
| 730,530 | 5/1955 | Great Britain. |

MORRIS O. WOLK, *Primary Examiner.*

ALPHONSO D. SULLIVAN, *Examiner.*